(12) United States Patent
Kim et al.

(10) Patent No.: US 9,025,639 B2
(45) Date of Patent: May 5, 2015

(54) MODULATION AND DEMODULATION METHOD FOR SATELLITE COMMUNICATION USING WIDESPREAD SIGNAL-TO-NOISE RATIO (SNR)

(71) Applicant: Electronics and Telecommunications Research Institute, Daejeon (KR)

(72) Inventors: Pan Soo Kim, Daejeon (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 13/754,436

(22) Filed: Jan. 30, 2013

(65) Prior Publication Data

US 2013/0195148 A1 Aug. 1, 2013

(30) Foreign Application Priority Data

Jan. 31, 2012 (KR) .................. 10-2012-0009877

(51) Int. Cl.
- H04B 1/00 (2006.01)
- H04B 1/7097 (2011.01)
- H04N 21/2383 (2011.01)
- H04N 21/438 (2011.01)
- H04L 1/00 (2006.01)
- H04L 1/08 (2006.01)

(52) U.S. Cl.
CPC ......... *H04B 1/7097* (2013.01); *H04N 21/2383* (2013.01); *H04N 21/4382* (2013.01); *H04L 1/0079* (2013.01); *H04L 1/08* (2013.01)

(58) Field of Classification Search
CPC ............. H04B 1/7097; H04N 21/2383; H04N 21/4382; H04L 1/0079; H04L 1/08
USPC ................... 375/146, 147, 220, 227, 240.01, 375/240.26; 370/216
See application file for complete search history.

(56) References Cited

U.S. PATENT DOCUMENTS

| | | |
|---|---|---|
| 2010/0118920 A1 | 5/2010 | Kim et al. |
| 2010/0128661 A1 * | 5/2010 | Becker et al. .................. 370/316 |
| 2011/0176603 A1 * | 7/2011 | Beeler et al. ............. 375/240.02 |

OTHER PUBLICATIONS

C. Morlet, et al; "Implementation of Spreading Techniques in Mobile DVB-S2/DVB-RCS systems", International Workshop on Satellite and Space Communications, 2007, IWSSC '07, Sep. 13-14, 2007; pp. 259-263.

* cited by examiner

*Primary Examiner* — Leon Flores
(74) *Attorney, Agent, or Firm* — Ladas & Parry LLP

(57) ABSTRACT

Provided are a modulation method and a demodulation method for satellite communication using a widespread signal-to-noise ratio (SNR), the method including: adding a dummy frame to a broadcasting/communication signal frame for signal transmission of a digital video broadcasting-satellite second generation (DVB-S2) modulator; verifying a spreading factor; adding the same physical layer header to the broadcasting/communication signal frame to which the dummy frame is added, repeatedly the number of times corresponding to the verified spreading factor; and repeating the same data, for example, PL frame data as the physical layer header.

8 Claims, 8 Drawing Sheets

| Mode | Spectral efficiency | Ideal $E_s/No(dB)$ for FECFRAME length = 64800 |
|---|---|---|
| QPSK 1/4 | 0,490243 | -2,35 |
| QPSK 1/3 | 0,656448 | -1,24 |
| QPSK 2/5 | 0,789412 | -0,30 |
| QPSK 1/2 | 0,988858 | 1,00 |
| QPSK 3/5 | 1,188304 | 2,23 |
| QPSK 2/3 | 1,322253 | 3,10 |
| QPSK 3/4 | 1,487473 | 4,03 |
| QPSK 4/5 | 1,587196 | 4,68 |
| QPSK 5/6 | 1,654663 | 5,18 |
| QPSK 8/9 | 1,766451 | 6,20 |
| QPSK 9/10 | 1,788612 | 6,42 |
| 8PSK 3/5 | 1,779991 | 5,50 |
| 8PSK 2/3 | 1,980636 | 6,62 |
| 8PSK 3/4 | 2,228124 | 7,91 |
| 8PSK 5/6 | 2,478562 | 9,35 |
| 8PSK 8/9 | 2,646012 | 10,69 |
| 8PSK 9/10 | 2,679207 | 10,98 |
| 16APSK 2/3 | 2,637201 | 8,97 |
| 16APSK 3/4 | 2,966728 | 10,21 |
| 16APSK 4/5 | 3,165623 | 11,03 |
| 16APSK 5/6 | 3,300184 | 11,61 |
| 16APSK 8/9 | 3,523143 | 12,89 |
| 16APSK 9/10 | 3,567342 | 13,13 |
| 32APSK 3/4 | 3,703295 | 12,73 |
| 32APSK 4/5 | 3,951571 | 13,64 |
| 32APSK 5/6 | 4,119540 | 14,28 |
| 32APSK 8/9 | 4,397854 | 15,69 |
| 32APSK 9/10 | 4,453027 | 16,05 |

NOTE: Given the system spectral efficiency $\eta_{tot}$ the ratio between the energy per information bit and single sided noise power spectral density $E_b/N_0 = E_s/N_0 - 10\log_{10}(\eta_{tot})$.

MODULATION AND DEMODULATION METHOD FOR SATELLITE COMMUNICATION USING WIDESPREAD SIGNAL-TO-NOISE RATIO (SNR)

CROSS-REFERENCE TO RELATED APPLICATION

This application claims the priority benefit of Korean Patent Application No. 10-2012-0009877, filed on Jan. 31, 2012, in the Korean Intellectual Property Office, the disclosure of which is incorporated herein by reference.

BACKGROUND

1. Field of the Invention

The present invention relates to an additional frame configuration for transmission in a significantly low signal-to-noise ratio (SNR) environment in digital video broadcasting-satellite second generation (DVB-S2) standard based transmission.

2. Description of the Related Art

A conventional digital video broadcasting-satellite second generation (DVB-S2) transmission system may perform transmission suitable for a channel environment in the signal-to-noise ratio (SNR) range of about 2.35 dB to about 16 dB as shown in a table 100 of FIG. 1. However, in the case of satellite communication, due to a rainfall environment and a difficulty coming from antenna installation, an SNR may be significantly low. In addition, a mobile terminal, when transmitting a high SNR signal, it may cause interference in a neighboring channel due to an antenna pointing error. Accordingly, when transmitting and receiving a satellite signal, there is a need to transmit a significantly low SNR signal. In the case of a current DVB-S2 standard, a new framework may not be performed since a large number of transmitters and receivers are already installed. Accordingly, a frame configuration not affecting existing equipment may be required.

A band spreading technology may be employed. The existing band spreading technology requires a separate apparatus for a band spreading function and thus, a receiver that does not support the band spreading function may have a difficulty in receiving data.

In general, the satellite communication may operate using a fixed bandwidth. The band spreading technology generally refers to a technology of spreading a bandwidth of a signal in order to transmit low signal power. A plurality of methods may be employed to spread the bandwidth, for example, a technology of repeatedly transmitting the same data and combining the data in a reception end to thereby enhance signal strength.

Accordingly, to simultaneously employ the band spreading technology and a technology not spreading a band, an amount of data of a signal of which a band is to be spread from a fixed bandwidth needs to be decreased. In this case, when an amount of data decreases due to a DVB-S2 form, many dummy frames may occur. Based on the above concept, a dummy frame may be substituted to be in a form in which an existing signal frame is repeated.

Generally, the band spreading technology may predict a temporal symbol repetition technology, a frame repetition technology, and a frequency repetition technology.

The frequency repetition technology employs a nonlinear amplifier for the satellite communication and thus, intermodulation distortion occurs. Accordingly, it is difficult to apply a multi-carrier technology.

The symbol repetition technology is generally known as a direct-sequence (DS) band spreading technology. However, an existing DVB-S2 receiver may not receive such signal waveform.

In the case of the frame repetition technology, reception becomes impossible in a low SNR environment.

When performing synchronous accumulation of the respective received signals, the reception may become possible. However, in the case of an adaptive coding and modulation (ACM) technology employed in DVB-S2, a frame length varies and thus, it may be impossible to perform the synchronous accumulation.

SUMMARY

According to an aspect of the present invention, there is provided an operation method of a modulator in which a band spreading function is added, the method including: adding a dummy frame to a broadcasting/communication signal frame for signal transmission of a digital video broadcasting-satellite second generation (DVB-S2) modulator; verifying a spreading factor; and adding the same physical layer header to the broadcasting/communication signal frame to which the dummy frame is added, repeatedly the number of times corresponding to the verified spreading factor.

According to another aspect of the present invention, there is provided an operation of a demodulator in which a band spreading function is added, the method including: determining whether a signal-to-noise ratio (SNR) of a received signal is less than or equal to a predetermined reference; collecting a plurality of physical layer headers from the received signal when the SNR of the received signal is less than or equal to the predetermined reference; and demodulating the received signal using the plurality of physical layer headers.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 1 is a table showing a physical layer performance in a conventional digital video broadcasting-satellite second generation (DVB-S2) technology;

DETAILED DESCRIPTION

Figure 2:
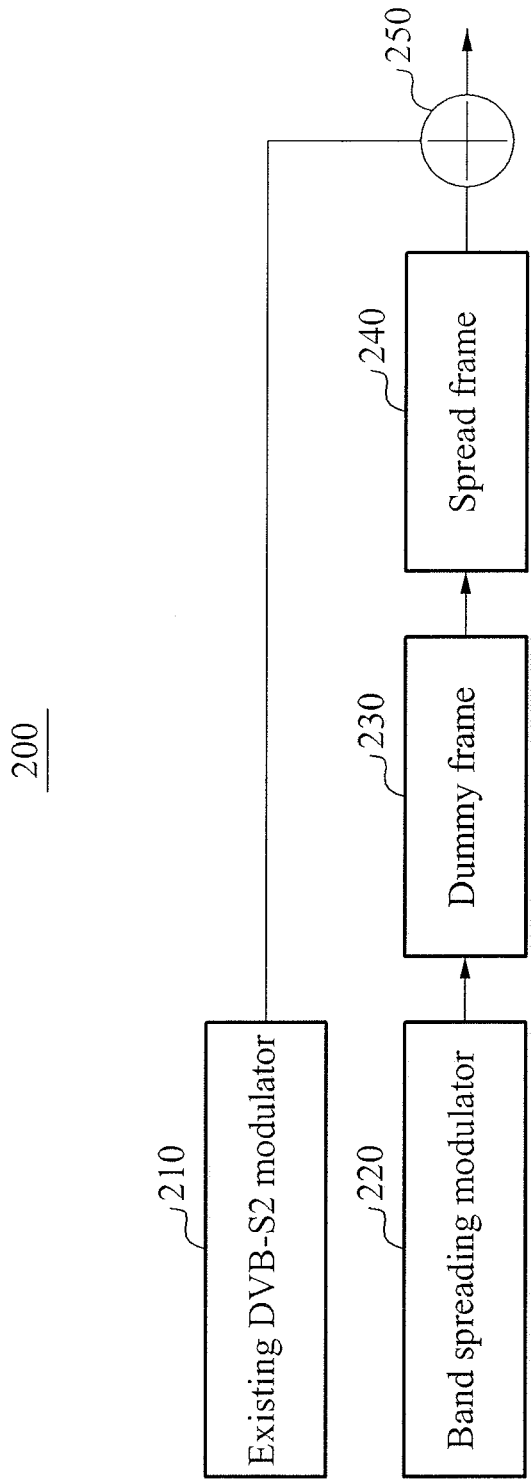
FIG. 2 is a block diagram to describe a function of a modulator in which a band spreading function is added according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus, may be changed depending on a user, the intent of an operator, or a custom. Accordingly, the terminologies must be defined based on the following overall description of this specification.

FIG. 2 is a block diagram to describe a function of a modulator 200 in which a band spreading function is added according to an embodiment of the present invention.

In an existing digital video broadcasting-satellite second generation (DVB-S2) satellite broadcasting standard, reception is possible in both a theoretical aspect and a configuration aspect in an signal-to-noise ratio (SNR) environment greater than or equal to −2.35 dB. According to the present invention, by providing transmission and reception in an SNR environment less than −2.35 dB, it is possible to provide a service without affecting an existing service subscriber utilizing existing transmission and reception.

For the above purpose, as shown in FIG. 2, the modulator 200 in which the band spreading function is added according to an embodiment of the present invention may add up, using an adder 250, a band spreading modulator 220, and a dummy frame 230, and a spread frame 240 together with an existing DVB-S2 modulator 210. Through this, the modulator 200 may transmit a frame to which a band spreading technology is applied and a frame to which the band spreading technology is not applied.

The existing DVB-S2 modulator 210 may indicate a transmitter to transmit a broadcasting signal and a communication signal based on DVB-S2.

The band spreading modulator 220 may indicate a transmitter to perform transmission and reception in an SNR environment less than −2.35 dB.

The modulator 200 may perform transmission signal by adding the dummy frame 230 to a frame for signal transmission of the existing DVB-S2 modulator 210 and by also adding a physical layer header, for example, 90 symbols corresponding to a spreading factor.

When the spreading factor is "1", it will be the same as an existing DVB-S2 frame. When the spreading factor is "2", two same physical layer headers are added. Seven bits of information is extracted from 64 symbols included in PLSCODE of the physical layer header. Here, to extract errorless seven bits of information, an SNR needs to be greater than or equal to −2.35 dB.

When such signal is added up twice in order to transmit the signal at an SNR less than −2.35 dB, 3 dB may be enhanced. Accordingly, the SNR may be increased through repetitive transmission. Accordingly, when a signal is transmitted at an SNR of −5 dB, the signal may be accumulated twice and thereby be detected and determined. When a signal is transmitted at an SNR of −10 dB, the SNR has a difference of −7.65 dB with respect to −2.35 dB and thus, the physical layer header needs to be transmitted repeatedly at least three times.

Figure 3:
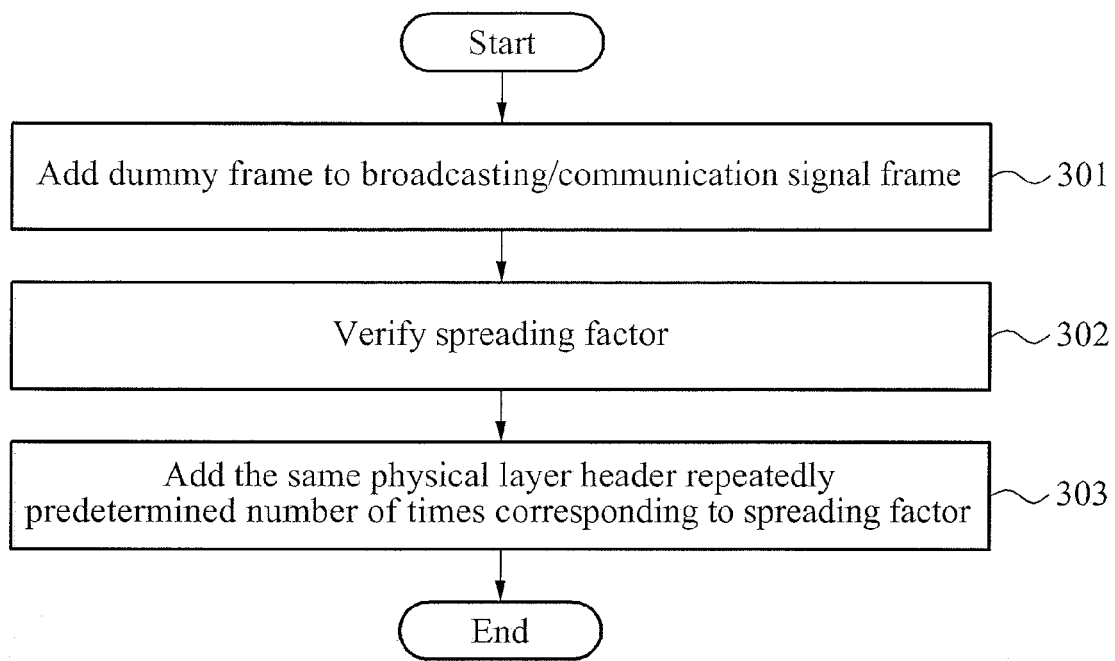
FIG. 3 is a flowchart illustrating an operation method of a modulator in which a band spreading function is added according to an embodiment of the present invention.

FIG. 3 is a flowchart illustrating an operation method of a modulator in which a band spreading function is added according to an embodiment of the present invention.

Referring to FIG. 3, in operation 301, a dummy frame may be added to a broadcasting/communication signal frame for signal transmission of a DVB-S2 modulator.

In operation 302, a spreading factor may be verified. In operation 303, the same physical layer header may be added to the broadcasting/communication signal frame repeatedly the number of times corresponding to the verified spreading factor.

In this instance, operation 303 may include adding the same physical layer header to the broadcasting/communication signal frame to which the dummy frame is added, repeatedly twice, when the verified spreading factor is "2", adding the same physical layer header to the broadcasting/communication signal frame to which the dummy frame is added, repeatedly three times, when the verified spreading factor is "3", and adding the same physical layer header to the broadcasting/communication signal frame to which the dummy frame is added, repeatedly four times, when the verified spreading factor is "4".

According to an embodiment of the present invention, the operation method of the modulator in which the band spreading function is added may further include repeatedly adding the same physical layer header and data area to the broadcasting/communication signal frame to which the dummy frame is added.

For example, the present invention relates to a method of repeating data of the same physical layer header and also repeating a data area. Therefore, even when replacing a coding rate of a physical layer frame constituting an existing 16 amplitude and phase shift keying (APSK)+nonpilot mode+ 64K low density parity check (LDPC) frame with ¼ of a π/2 bi-phase shift keying (BPSK)+nonpilot mode+16K LDPC coding rate and thereby transmitting the physical layer frame, the physical layer frame may be recognized using the substituted Modulation and Coding (MODCOD) and thereby be received.

Figure 4:
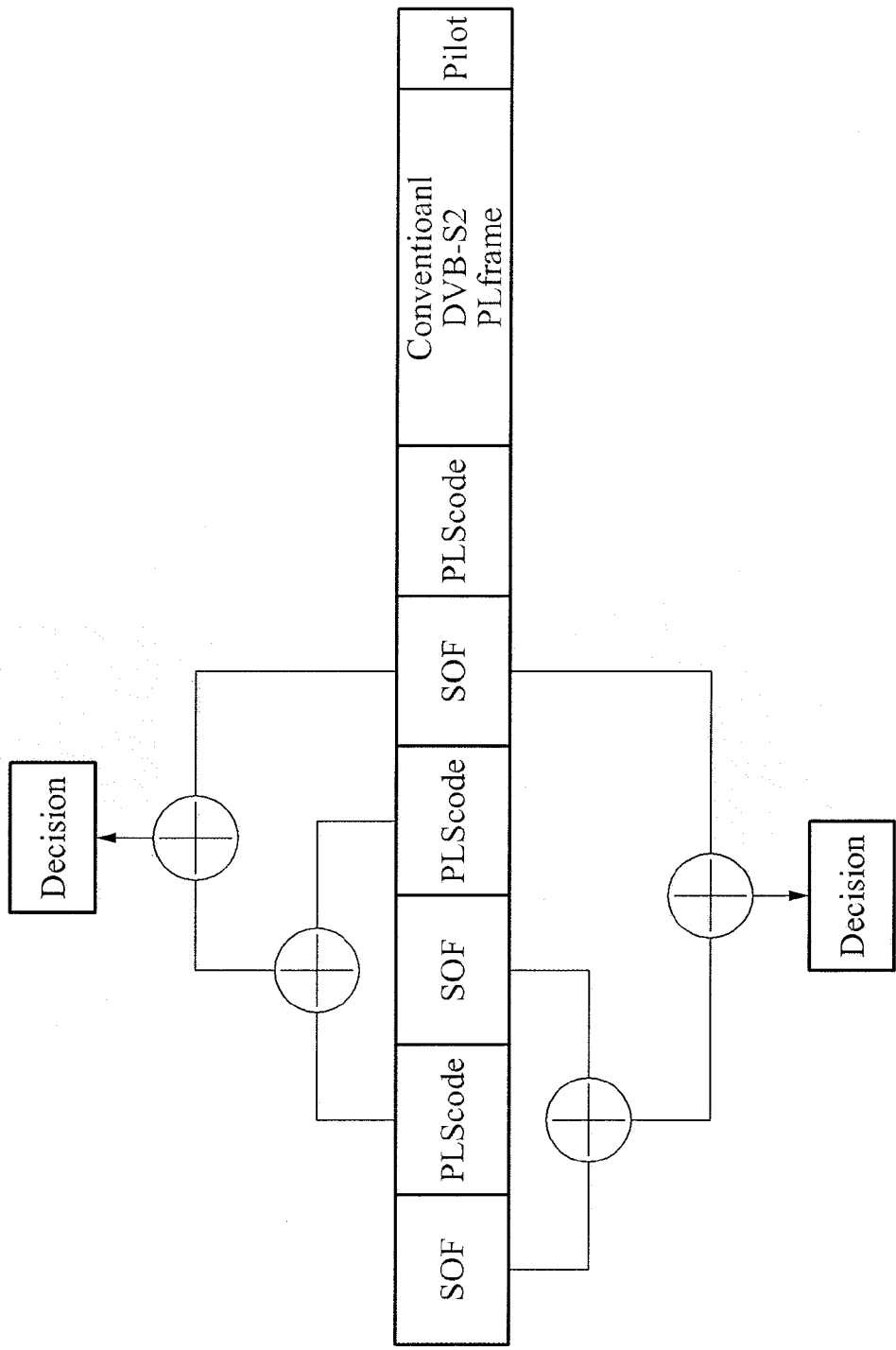
FIG. 4 is a diagram to describe a DVB physical layer frame to be flagged for DVB-S2 band spreading according to an embodiment of the present invention.

FIG. 4 is a diagram to describe a DVB physical layer frame 400 to be flagged for DVB-S2 band spreading according to an embodiment of the present invention.

When a signal is transmitted at an SNR of −5 dB, the signal may be accumulated twice and thereby be detected and determined. When a signal is transmitted at an SNR of −10 dB, the SNR has a difference of −7.65 dB with respect to −2.35 dB and thus, the physical layer header needs to be transmitted repeatedly at least three times.

In FIG. 4, the number of times that the physical layer header is repeated in a signal transmitted after modulation may be determined.

In the case of MODCOD number 29, a spreading factor is "2". Therefore, two frames, each including start of frame (SOF)+physical layer signaling code (PLSCODE) 90 symbols, are input whereby a frame including 180 symbols is input.

In the case of MODCOD number 30, the spreading factor is "3" and thus, a frame including 270 symbols is input. In the case of MODCOD number 31, the spreading factor is "4" and thus, a frame including 360 symbols is input. The input frames may be combined and thereby be detected.

Initially, due to a frequency error of an input signal, an output value of an SOF correlator is compared with a threshold that is temporarily determined based on each spreading factor, for example, "2", "3", and "4". Through accumulative comparison, a temporary spreading factor may be determined.

A coarse frequency error may be estimated based on the determined temporary spreading factor. By compensating for combined MODCOD using a plurality of frequency error values and performing MODCOD decoding, it is possible to verify that a temporarily determined spread frame and an MODCOD value. In the case of matching, that the spread frame is input may be verified and a frequency error and a plurality of channel errors may be compensated for. Next, a received signal may be despread by performing synchronous accumulation of the received signal in a circular combination form based on the spreading factor. By storing the received signal by a length of the spreading factor, a portion of a symbol synchronization and a frequency synchronization may be compensated for. Next, the received signal may be despread through synchronous accumulation.

Figure 5:
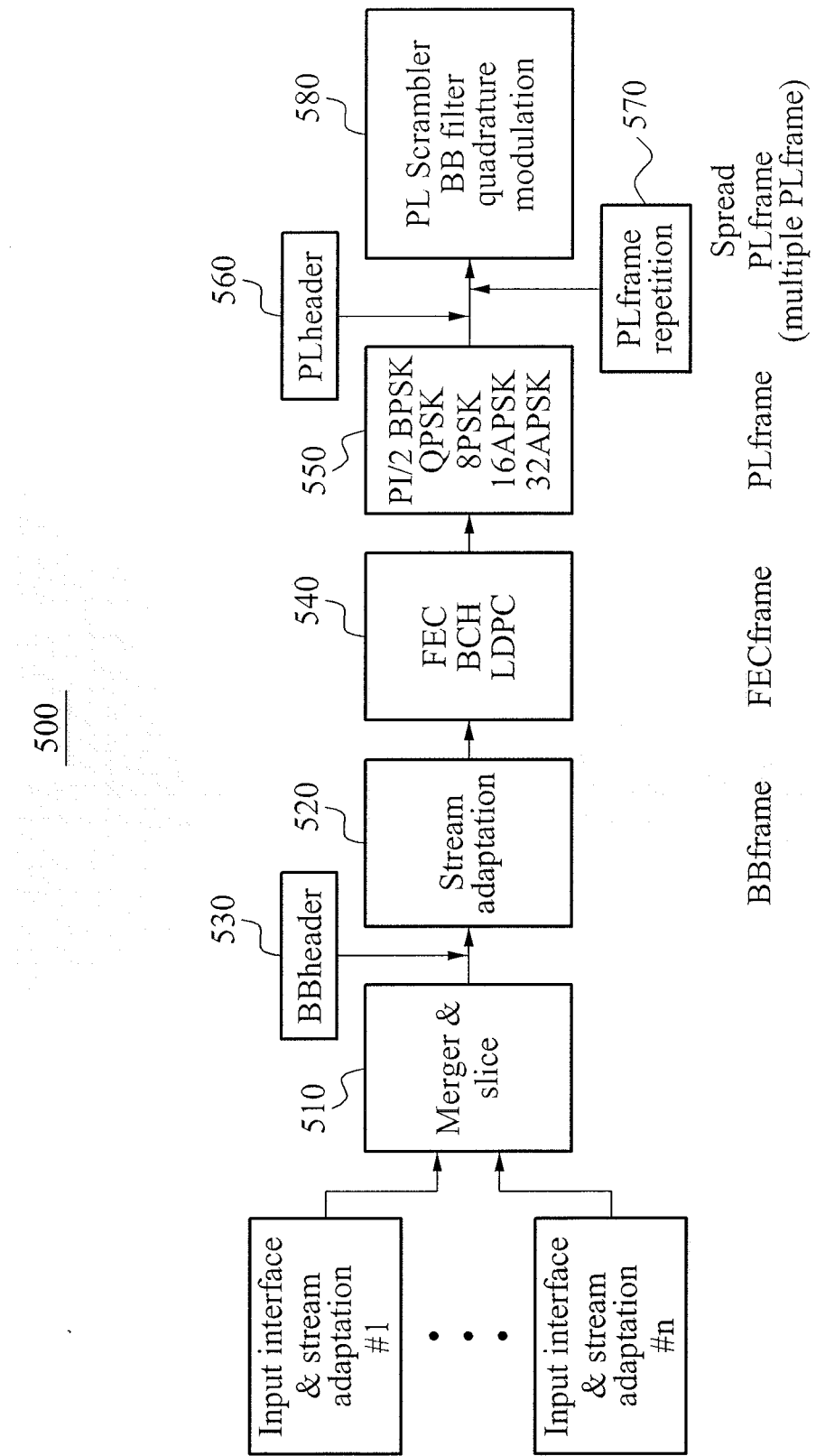
FIG. 5 is a block diagram illustrating a configuration of a modulator according to an embodiment of the present invention.

FIG. 5 is a block diagram illustrating a modulator 500 according to an embodiment of the present invention.

The modulator 500 may include a structure for performing a band spreading and transmission function, in an existing DVB-S2 transmitter structure.

The modulator 500 may replace an existing MODCOD frame with a spread frame. In an existing 64APSK modulation scheme, in the case of a nonpilot mode and 64K frame, a length of a physical layer frame corresponds to 16290 symbols.

The modulator 500 may configure a spread frame with the length of 16290 symbols by performing $\pi/2$ BPSK modulation and 16K LDPC frame encoding with respect to the above existing scheme, and thereby adding a physical layer header.

For the above purpose, the modulator 500 may include a mode adaption 510, a stream adaption 520, a forward error correction (FEC) encoder 540, a mapping unit 550, a physical layer header processing unit 560, a physical layer frame repetition processing unit 570, and a physical layer framing and modulation unit 580.

The mode adaption 510 may be determined based on an application, and may perform interface of an input stream, synchronization of the input stream, a null-packet removal for an Adaptive Coding and Modulation (ACM) mode and a Transport Stream (TS) input format, Cyclic Redundancy Code (CRC)-8 encoding for error detection, input stream mixing for multiple input streams, and the like. As a format to configure a frame, a baseband (BB) header 530 adds an input stream format and a mode adaption form to a front end of a data field in order to inform a receiver.

The stream adaption 520 may perform padding, BB scrambling, and the like in order to generate a BB frame.

The FEC encoder 540 may perform error correction by employing Broadcast Channel Protocol (BCH) coding, for external coding and employing various coding rates of LDPC coding for internal coding. Depending on applications, the FEC encoder 540 may configure a length of a FEC coding block using 64,800 bits or 16,200 bits.

Also, the FEC encoder 540 may perform bit-interleaving in 8 phase shift keying (PSK), 16APSK, and 32APSK modulation, and may not perform bit-interleaving in BPSK and quadrature phase shift keying (QPSK) modulation.

The mapping unit 550 may perform $\pi/2$ BPSK, QPSK, 8PSK, 16APSK, and 32APSK constellation, and may determine bit-mapping based on an area to be applied or a state of a transmission channel. In particular, the mapping unit 550 may configure a spread frame with the length of 16290 symbols by performing $\pi/2$ BPSK modulation and 16K LDPC encoding and thereby adding a physical layer header. Through this, the mapping unit 550 may replace an existing MODCOD frame with the spread frame.

To achieve a low bit error rate, gray mapping may be performed in $\pi/2$ BPSK, QPSK, and 8PSK constellation.

The physical layer header processing unit 560 may insert the physical layer header into the replaced spread frame. The physical layer repetition processing unit 570 may repeat the physical layer frame into which the physical layer header is inserted, a predetermined number of times corresponding to the spreading factor.

Next, the physical layer framing and modulation unit 580 may perform synchronization with a FEC frame that is a block coding, and may configure a physical layer frame by inserting a dummy frame depending on necessity in order to maintain a symbol rate, and by inserting a pilot symbol for carrier recovery of a receiver and a physical layer header that is modulation/coding rate information and frame synchronization. Also, the physical layer framing and modulation unit 580 may perform physical layer scrambling for energy distribution.

Figure 6:
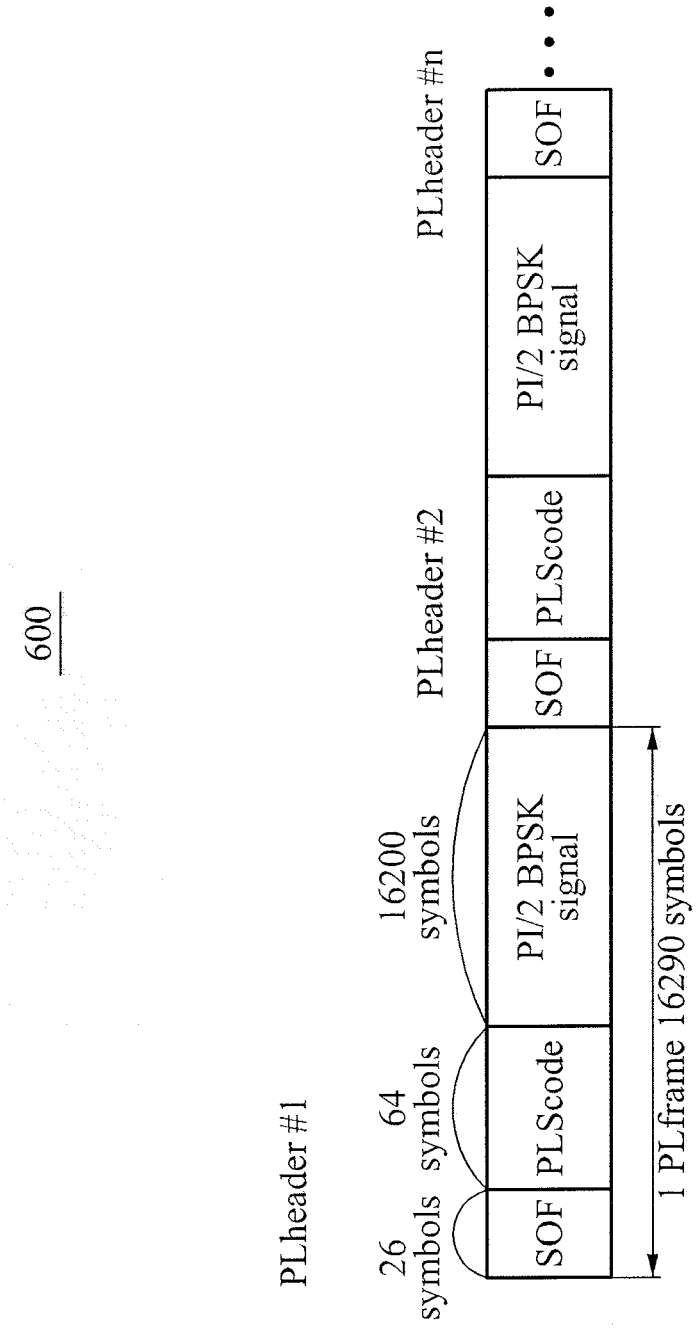
FIG. 6 is a diagram to describe a configuration of a spread frame according to an embodiment of the present invention.

FIG. 6 is a diagram to describe a configuration of a spread frame 600 according to an embodiment of the present invention.

The spread frame 600 is a frame modulated for actual transmission. The spread frame 600 may include a SOF field indicating start point information about each spread frame and a PLSCODE field indicating a transmission scheme and the like. Here, $\pi/2$ BPSK modulated and 16K LDPC encoded signal may be combined and thereby be repeatedly combined.

Figure 7:
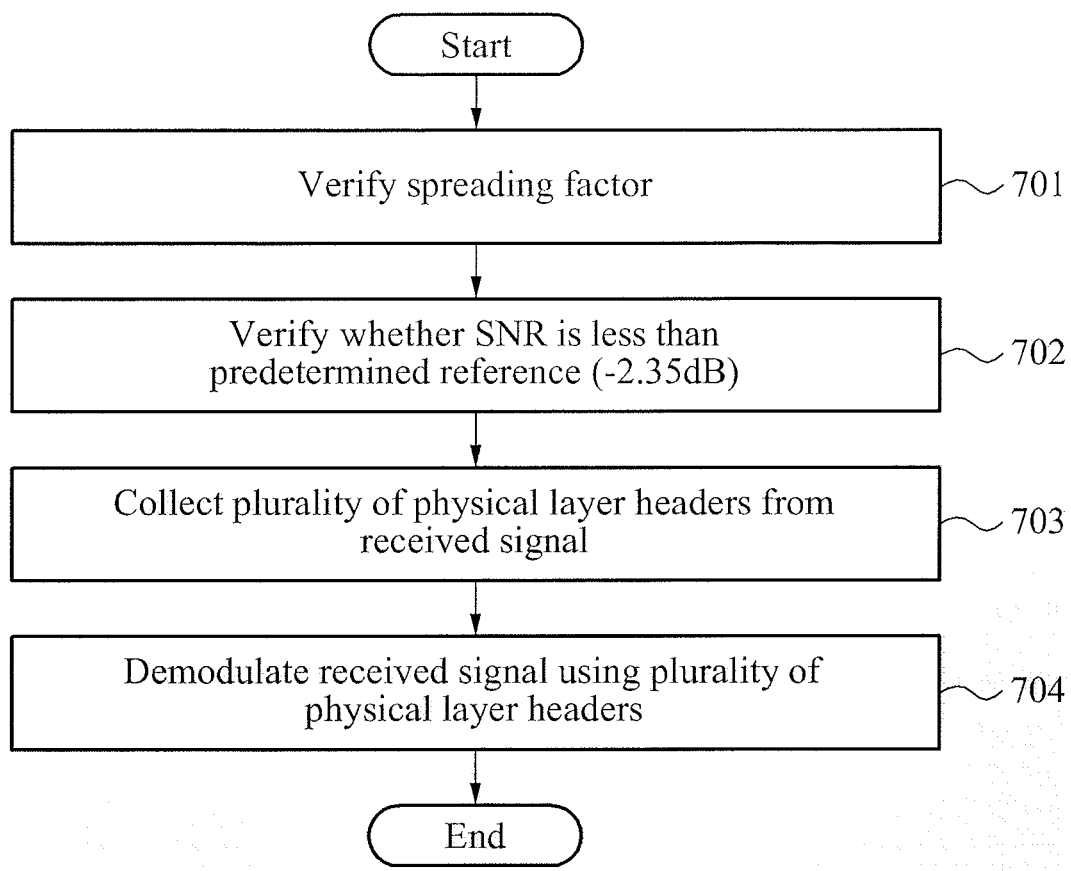
FIG. 7 is a flowchart illustrating an operation method of a demodulator in which a band spreading function is added according to an embodiment of the present invention.

FIG. 7 is a flowchart illustrating an operation method of a demodulator in which a band spreading function is added according to an embodiment of the present invention.

In operation 701, a spreading factor with respect to a received signal may be verified. In operation 702, whether an SNR of the received signal is less than or equal to a predetermined reference may be verified. For example, whether the SNR of the received signal is less than or equal to −2.35 dB may be verified.

In operation 703, when the SNR of the received signal is less than or equal to the predetermined reference, a plurality of physical layer headers may be collected from the received signal.

In operation 704, the received signal may be demodulated using the collected plurality of physical layer headers.

Also, operation 704 may include detecting a frame from the plurality of physical layer headers, recovering a carrier, and detecting MODCOD using a physical layer header processor.

Also, operation 704 may further include detecting a spreading factor corresponding to the detected MODCOD, and despreading the received signal based on the detected spreading factor.

Also, the despreading of the received signal based on the detected spreading factor may include despreading the received signal by performing synchronous accumulation of the received signal in a circular combination form, and storing and thereby despreading the received signal by a length of the spreading factor.

Figure 8:
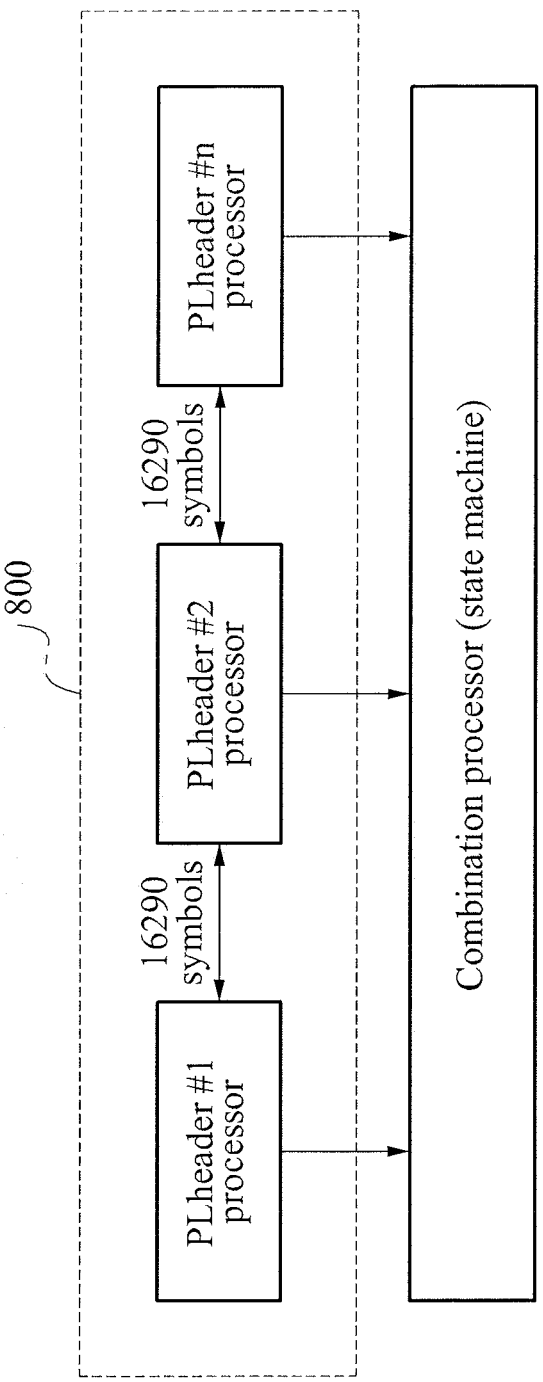
FIG. 8 is a diagram to describe an example of demodulating a signal using a physical layer header according to an embodiment of the present invention.

FIG. 8 is a diagram to describe an example of demodulating a signal using a physical layer header according to an embodiment of the present invention. When an SNR of a received signal is less than −2.5 dB, a signal may not be demodulated using a single physical layer header. Accordingly, frame detection, carrier recovery, MODCOD detection, and the like may be performed by collecting data of a plurality of physical layer headers, for example, n physical layer headers, and by operating the collected data in a plurality of physical layer header processors 800.

According to an embodiment of the present invention, there may be provided an apparatus and method that may not affect a existing DVB-S2 based terminal device while transmitting data in a very wide SNR environment in a DVB-S2 based satellite communication and broadcasting system.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An operation method of a modulator in which a band spreading function is added, the method comprising:
    adding a dummy frame to a broadcasting/communication signal frame for signal transmission of a digital video broadcasting-satellite second generation (DVB-S2) modulator;
    verifying a spreading factor; and
    adding the same physical layer header to the broadcasting/communication signal frame to which the dummy frame is added, repeatedly the number of times being equal to the verified spreading factor.

2. The method of claim 1, wherein the adding of the same physical layer header comprises:
    adding the same physical layer header to the broadcasting/communication signal frame to which the dummy frame is added, repeatedly twice, when the verified spreading factor is "2";
    adding the same physical layer header to the broadcasting/communication signal frame to which the dummy frame is added, repeatedly three times, when the verified spreading factor is "3"; and
    adding the same physical layer header to the broadcasting/communication signal frame to which the dummy frame is added, repeatedly four times, when the verified spreading factor is "4".

3. The method of claim 1, wherein the physical layer header comprises information about a start of frame (SOF) and a physical layer signaling code.

4. The method of claim 1, wherein the adding of the same physical layer header comprises:
    adding the same physical layer frame to the broadcasting/communication signal frame to which the dummy frame is added, repeatedly twice, when the verified spreading factor is "2";
    adding the same physical layer frame to the broadcasting/communication signal frame to which the dummy frame is added, repeatedly three times, when the verified spreading factor is "3"; and
    adding the same physical layer frame to the broadcasting/communication signal frame to which the dummy frame is added, repeatedly four times, when the verified spreading factor is "4".

5. The method of claim 1, further comprising adding the same physical layer header and data area to the broadcasting/communication signal frame to which the dummy frame is added.

6. An operation method of a modulator in which a band spreading function is added, the method comprising:
    adding a dummy frame to a broadcasting/communication signal frame for signal transmission of a digital video broadcasting-satellite second generation (DVB-S2) modulator;
    verifying a spreading factor; and
    adding the same physical layer header to the broadcasting/communication signal frame to which the dummy frame is added, repeatedly the number of times corresponding to the verified spreading factor, wherein the adding of the same physical layer header comprises:
        adding the same physical layer frame to the broadcasting/communication signal frame to which the dummy frame is added, repeatedly twice, when the verified spreading factor is "2";
        adding the same physical layer frame to the broadcasting/communication signal frame to which the dummy frame is added, repeatedly three times, when the verified spreading factor is "3"; and
        adding the same physical layer frame to the broadcasting/communication signal frame to which the dummy frame is added, repeatedly four times, when the verified spreading factor is "4".

7. An operation of a demodulator in which a band spreading function is added, the method comprising:
    determining whether a signal-to-noise ratio (SNR) of a received signal is less than or equal to a predetermined reference;
    collecting a plurality of physical layer headers from the received signal when the SNR of the received signal is less than or equal to the predetermined reference; and
    demodulating the received signal using the plurality of physical layer headers,
    wherein the demodulating comprises:
        detecting a frame from the plurality of physical layer headers, recovering a carrier, and detecting Modulation and Coding (MODCOD) using a physical layer header processor;
        detecting a spreading factor corresponding to the detected MODCOD; and
    despreading the received signal based on the detected spreading factor
        despreading the received signal based on the detected spreading factor by performing synchronous accumulation of the received signal in a circular combination form, and storing and thereby despreading the received signal by a length of the spreading factor.

8. The method of claim 7, further comprising:
    repeatedly adding the same physical header layer and data area to a broadcasting/communication signal frame to which a dummy frame is added.

* * * * *